United States Patent [19]

Gauger

[11] Patent Number: 4,992,175
[45] Date of Patent: Feb. 12, 1991

[54] METHOD FOR IMPROVING THE SEPARATION PROPERTIES OF SEMI-PERMEABLE MEMBRANES AND MEMBRANES ACCORDINGLY IMPROVED

[76] Inventor: Jurgen F. Gauger, 34, Ch. des Mesanges, Geneva, Switzerland, CH-1226

[21] Appl. No.: 326,665
[22] PCT Filed: Jun. 25, 1987
[86] PCT No.: PCT/SE87/00297
 § 371 Date: Feb. 27, 1989
 § 102(e) Date: Feb. 27, 1989
[87] PCT Pub. No.: WO88/10140
 PCT Pub. Date: Dec. 29, 1988
[51] Int. Cl.$^5$ ............................................. B01D 65/10
[52] U.S. Cl. ..................................... 210/638; 210/490; 210/500.23
[58] Field of Search ................... 210/490, 500.22, 651, 210/638, 500.23; 427/245, 246; 264/41

[56] References Cited

U.S. PATENT DOCUMENTS 3,912,834 10/1975 Imai et al. ........................ 210/490 X
4,014,798 3/1977 Rembaum ....................... 210/500.23
4,045,352 8/1977 Rembaum et al. ............. 210/500.23
4,239,714 12/1980 Sparks et al. .............. 210/500.28 X
4,814,083 3/1989 Ford et al. ................. 210/500.28 X

FOREIGN PATENT DOCUMENTS

A14054 8/1980 European Pat. Off. .
A87955 9/1983 European Pat. Off. .
A209935 1/1987 European Pat. Off. .

Primary Examiner—Frank Spear
Attorney, Agent, or Firm—Eric Y. Munson; Mark P. Stone

[57] ABSTRACT

A method for improving the separation properties of semi-permeable membranes having penetrating defects due to the manufacturing process or subsequent handling and membranes accordingly improved. During a certain time one side of the membrane is exposed to a first chemical reaction partner and the other side of the membrane is exposed to a second chemical reaction partner so that in the penetrating membrane defects a chemical reaction will take place in a boundary region between the two reaction partners forming occlusions blocking said defects.

18 Claims, No Drawings

METHOD FOR IMPROVING THE SEPARATION PROPERTIES OF SEMI-PERMEABLE MEMBRANES AND MEMBRANES ACCORDINGLY IMPROVED

TECHNICAL FIELD

The present invention pertains to a method for improving the separation properties of semi-permeable membranes and membranes accordingly improved.

BACKGROUND ART

Membrane separation processes for separation of liquids and substances dissolved in liquids and for gases have become very important in recent years and are replacing more and more conventional separation technologies.

The performance of the separations achieved is depending in the first place on the membrane material and the membrane thickness.

Since the flux rate of a membrane is inverse proportional to the thickness of the membrane, the membrane has to be very thin in order to achieve flux rates high enough for practical applications. Large surface areas of very thin membranes are difficult to produce and to handle, therefore they have to be supported by a porous media providing mechanical strength without reducing noticeably the membrane performance ("composite membrane").

Another method to produce high-flux membranes has been invented by Loeb et al, US-A-3,133,132. This method result sin asymmetrical membranes having a very thin tight surface layer supported by a spongy sub-structure of the same polymer material. This type of membranes is used today in large-scale separation systems for liquid media, e.g. in connection with water desalination by reverse osmosis. The original asymmetrical Loeb membranes were made from cellulose acetates and cellulose acetobutyrates and show a relatively small number of defects like so called pinholes. The Loeb process has also been applied to other polymers. However, it has been found that large and costly experimental programs had to be carried out before acceptable asymmetrical membranes could be obtained from non-cellulosic polymers. In addition, these membranes have quite generally more pinholes and other penetrating surface defects than those prepared from cellulose acetate.

Despite the larger number of pinholes, asymmetrical membranes made from non-cellulosic polymers have been applied successfully to separations in liquid systems, since the relatively high viscosity and high cohesive properties of liquids, as well as adsorption on and swelling of the membranes, limit the negative effects of pinholes.

For gas separations, however, pinholes in membranes present a much more severe problem since the gas transport through these holes is five to six orders of magnitude ($10^5$–$10^6$) higher than the transport through the membrane material. This is due to the low absorption and the very low viscosity and cohesive properties of gases.

A very important difference between liquid and gases is also the generally much lower solubility of the gases in the membrane polymer.

MONSANTO company, St. Louis, Mo., USA, describes US-A-4,230,463 multicomponent membranes for gas separations comprising a coating in contact with a porous separation membrane wherein the separation properties of the multicomponent, or composite, membrane is principally determined by the porous separation membrane as opposed to the material of the coating. This is achieved by choosing a coating material, e.g. polysiloxanes which exhibits less resistance to permeate gas flow than the porous support material, e.g. polysulfone. The support material, however, has a better separation factor and therefore determines the efficiency of the gas separation. Since the support has also a higher resistance to the gas flow, it practically also determines the flux rate. The beneficial effect of the coating is therefore mainly the occlusion of the pinholes and the protection of the polysulfone membrane against damages during handling and assembly in modules.

Large-scale gas separation systems based on asymmetrical hollow fiber composite membranes as described in US-A-4,230,463, have been developed by MONSANTO and commercially applied to different gas separations.

The company DOW CHEMICALS has developed symmetrical hollow fiber membranes based preferentially on polymethylpentene. Due to the extremely high gas permeability of this polymer, flux rates high enough for practical applications are obtained despite the symmetrical nature of the membrane. Since the thickness of this unsupported symmetrical membrane had to be reduced as much as possible while preventing a membrane collapse due to the pressure difference applied to the hollow fibers during operation of the membrane modules, hollow fibers with an extremely small diameter, i.e. less than a human hair, resulted from DOW's development.

DOW is commercialising their gas separation membrane in form of their GENERON modules and systems for air separation used for production of 90–98% nitrogen gas or oxygen enriched air.

BRIEF DISCLOSURE OF THE INVENTION

One object of the present invention is to provide a method for improving the separation properties of semi-permeable membranes, known per se.

To this category of membranes we also refer the number of interesting membrane candidates from for instance polymers other than cellulose acetates and cellulose acetobutyrates which has been the result from the research and development efforts mentioned above but which have not been commercialised so far due to the large number of surface defects.

The present invention would allow to convert these membrane candidates into membranes with properties intersecting for industrial applications.

The method is thereby characterised according to the enclosed claims.

In principle the resulting membranes are practically free from penetrating defects like pinholes, microfissures and so and the separation properties are therefore considerably improved.

This performance improvement is especially important for gas separation membranes, since even a relatively small number of pinholes can affect the selective separation in a very detrimental way.

Other objects and advantages will be apparent from the following description.

DESCRIPTION

The general idea underlaying the inventive method is based on the already unknown fact that for instance two different monomers like a diamine, or a diol and a bifunctional acid chloride dissolved in two non-miscible solvents can react at the phase boundary of the solvents and form a polymer film, e.g. of a polyamide (phase boundary polycondensation).

The method for improving the separation properties of a certain semi-permeable membrane, which according to the above by necessity has a number of pinholes and maybe also other penetrating membrane defects, is therefore directed to selectively repairing said defects.

To this effect, therefore, the membrane is on the one side exposed to a first appropriate liquid solution or gas and on the other side to a second appropriate liquid solution or gas during a certain time. The solutions or gases will react in a boundary region in the pinholes and defects forming occlusions blocking the undesirable flow through these membrane defects, thereby improving the separation properties of said membrane. The concentration of the reacting gases might be controlled by dilution with other gases.

For example, one of the solutions could be a primary or secondary diamine of the general formula $NH_1H-R_2-NR_3H$ (with $R_1$ and $R_3 = H$, aliphatic rest or aromatic rest and $R_2 =$ aliphatic or aromatic rest).

A bifunctional acid chloride of the general formula $ClOC-R_4-COCl$ ($R_4 =$ aliphatic or aromatic rest) is dissolved in a solvent non-miscible with water, e.g. in chloroform, and this solution is brought in contact with the other side of the membrane. In regions of pinholes or other penetrating surface defects, the two nonmiscible phases will enter in contact and a polymer film is formed at the interface occluding the hole:

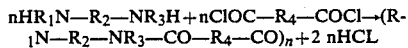

The evolving HCl can be bound by a non-condensible basic compound like pyridine.

Since the diffusion of the monomers through the dense membrane material is very slow as compared to the fast reaction kinetic of the polycondensation, the repair of the pinholes and other penetrating surface defects can be terminated before a noticeable reaction can take place at intact membrane areas.

In general the monomers or other active components should be selected in such way that undesirable side reactions with the membrane polymer are avoided.

After termination of the repair reaction, the surface of the membrane wetted by the aqueous solution of the diamine (or diol) is washed with water or a water miscible solvent and the surface of the membrane wetted by the chloroform solution of the bifunctional acid chloride is washed with chloroform or another solvent miscible with chloroform in order to remove the surplus monomers.

The repair process described in this application can also be advantageously achieved in pre-assembled membrane modules. IN the example above the solutions of the monomers are filled in the connecting pipes leading to the opposite sides of the membrane. Of instance, in the case of a hollow fiber module one of the solutions is filled in the pipe connection leading to the hollow fiber cores, the second solution is filled in the module part surrounding the hollow fiber bundle.

Another embodiment of the invention is a method based on catalyst initiated polymerisation.

A solution containing a monomer or prepolymer, e.g. a compound with a polymerisable double bound, is brought in contact with one side of the membrane. The other side of the membrane is brought in contact with a solution non-miscible with the first one and contains an initiator for the polymerisation reaction, e.g. an azocompound like azobisisobutyronitril or a perester, peracid or peroxide like benzoylperoxide. The polymerisation reaction is initiated in the pinholes and other penetrating membrane defects by diffusion of the catalyst into the solution containing the monomer. The resulting locally initiated polymerisation reaction leads to the formation of a polymer film occluding the pinhole or other penetrating membrane defect. In order to avoid that the polymerisation goes beyond the defect areas due to the chain reaction of the polymerisation process substances terminating the chain reaction, i.e. regulators, can be added in appropriate concentrations.

As a further alternative it is possible to apply one reaction partner i.e. either the monomer or the initiator, in gas or vapour form. In this case a monomer or initiator with a high enough vapour pressure is chosen or the process is achieved at increased temperature and the membrane is contacted at one side with a liquid phase containing one reaction partner and with a gas phase at the other membrane surface containing the complementary reaction partner, i.e. either the monomer or the initiator in vapour form or in the gas state. The vapour or gas can be applied undiluted or diluted with an inert gas stream (e.g. nitrogen). In some cases, e.g. in case where the membrane surface is not very hydrophilic, it can also be of advantage to reduce the overall gas pressure in order to get a certain penetration of the liquid phase into the pinholes. The same effect can be achieved by applying a pressure on the liquid contacting one of the membrane surfaces.

It is also possible to apply both reaction partners in the gas state. In this case it is advantageous to impregnate the membrane with a liquid before exposing it to the gaseous reaction partners. This helps to limit the reaction zone to the inside of the pinholes and other penetrating defects.

A still further alternative is based on crosslinking of polymers.

In this version of the membrane repair process one solution contains a polymer with functional groups available for cross-linking, and the second solution in contact with the opposite side of the membrane contains a crosslinking agent. Examples for the polymers are polyvinylalcohol, polyamins or cellulose derivatives; examples for the crosslinking agent are bifunctional aldehydes (e.g. glutardialdehyd) or bifunctional acid chloride. Crosslinking of the polymer occurs int he contact areas provided by pinholes or other penetrating membrane defects. The crosslinked polymers are insoluble and occlude the membrane defects.

A method based on precipitation of polymers is another advantageous embodiment of the invention. In this method one side of the membrane is in contact with a polymer solution and the other side of the membrane is in contact with a liquid which is a non-solvent or a bad solvent for the polymer. The polymer is precipitated in the defect areas by contact with the non-solvent occluding thus the pinholes or other penetrating membrane defects.

All the alternatives above can be applied to the repair of defects on flat membranes as well as membranes in the form of hollow fibres or tubular membranes. MOreover, the method can also be applied to all kinds of pre-fabricated membrane modules e.g. hollow fibre modules, spiral wound membrane modules, tubular modules and filter press type modules.

Besides the ease of operation such a use of the invention gives the additional important advantage that damages occurred during handling, e.g. cutting and potting, of the membranes and during the assembly in modules are also repaired.

I claim:

1. A method for improving the separation properties of semi-permeable membranes having penetrating defects due to the manufacturing process or subsequent handling
   characterised in that
   during a certain time
   one side of the membrane is exposed to a first chemical reaction partner
   the other side of the membrane is exposed to a second chemical reaction partner
   so that only in the penetrating membrane defects a chemical reaction will take place in a boundary region between the two reaction partners forming occlusions selectively blocking said defects.

2. A membrane improved according to the method of claim 1
   characterised in that it comprises
   a semi-permeable membrane having channels or pores between the two sides of the membrane blocked inside the membrane by means of occlusions of a polymer film.

3. A process according to claim 1, characterised in that said first chemical reaction partner is applied in gaseous or vapor form.

4. A process according to claim 3, characterised in that said second chemical reaction partner is applied in liquid form.

5. A process according to claim 1, characterised in that said first reaction partner is a pure gas or pure vapor.

6. A process according to claim 5 characterised in that said first reaction partner is a gas or vapor diluted by another gas.

7. A process according to claim 1 characterised in that said second reaction partner is a liquid.

8. A process according to claim 7 characterised in that said second reaction partner is a liquid diluted by a solvent.

9. A process according to claim 1 characterised in that one of said reaction partners initially penetrates one side of said membrane so that the reaction zone or boundary region will be situated within said defects.

10. A process according to claim 1 characterised in that both the first and the second reaction partners are in the gaseous form and that the membrane is impregnated with a liquid before the two membrane sides are exposed to the reaction partners.

11. A process according to claim 1 characterised in that said membrane forms part of a preassembled membrane module.

12. A process according to claim 1 characterised in that said chemical reaction is a phase boundary polycondensation.

13. A process according to claim 1 characterised in that said chemical reaction is a catalyst initiated polymerization.

14. A process according to claim 1 characterised in that said chemical reaction is based on further polymerization of prepolymers.

15. A process according to claim 1 characterised in that said chemical reaction is based on cross linking of polymers.

16. A process according to claim 1 characterised in that said chemical reaction is based on the precipitation of a polymer from its solution by a non solvent.

17. The process according to claim 1 characterised in that said second reaction partner is a solid dissolved in a solvent.

18. The process as claimed in claim 1 characterised in that said second reaction partner is a gas dissolved in a solvent.

* * * * *